United States Patent
Gohl et al.

(10) Patent No.: US 10,498,964 B2
(45) Date of Patent: Dec. 3, 2019

(54) ADAPTIVE MODES OF OPERATION BASED ON USER INTENTION OR ACTIVITY

(71) Applicant: GoPro, Inc., San Mateo, CA (US)

(72) Inventors: Pascal Gohl, Winterthur (CH); Thomas Gubler, Winterthur (CH); Axel Murguet, Zurich (CH); Garance Bruneau, Zurich (CH)

(73) Assignee: GoPro, Inc., San Mateo, CA (US)

( * ) Notice: Subject to any disclaimer, the term of this patent is extended or adjusted under 35 U.S.C. 154(b) by 91 days.

(21) Appl. No.: 15/856,706

(22) Filed: Dec. 28, 2017

(65) Prior Publication Data

US 2019/0208101 A1    Jul. 4, 2019

(51) Int. Cl.
    *H04N 5/232*    (2006.01)

(52) U.S. Cl.
    CPC ....... *H04N 5/2328* (2013.01); *H04N 5/23245* (2013.01); *H04N 5/23254* (2013.01); *H04N 5/23258* (2013.01); *H04N 5/23261* (2013.01)

(58) Field of Classification Search
    None
    See application file for complete search history.

(56) References Cited

U.S. PATENT DOCUMENTS

| | | | | |
|---|---|---|---|---|
| 9,489,167 | B2 * | 11/2016 | Mori | G06F 3/1446 |
| 2008/0260369 | A1 * | 10/2008 | Ibaraki | H04N 5/232 |
| | | | | 396/55 |
| 2014/0184867 | A1 * | 7/2014 | Sudo | G06F 3/0488 |
| | | | | 348/333.01 |
| 2015/0036047 | A1 * | 2/2015 | Bledsoe | H04N 5/2254 |
| | | | | 348/375 |
| 2015/0054846 | A1 * | 2/2015 | Okada | G09G 5/10 |
| | | | | 345/589 |
| 2015/0370250 | A1 * | 12/2015 | Bachrach | G05D 1/0016 |
| | | | | 701/2 |
| 2016/0105619 | A1 * | 4/2016 | Lee | H04N 5/232 |
| | | | | 348/333.01 |
| 2016/0198093 | A1 * | 7/2016 | Ito | H04N 5/23245 |
| | | | | 348/333.02 |
| 2016/0241767 | A1 * | 8/2016 | Cho | H04N 5/23203 |
| 2016/0360118 | A1 * | 12/2016 | Morgenstern | H04N 5/23293 |
| 2016/0373612 | A1 * | 12/2016 | Zhang | H04N 1/3878 |
| 2018/0046187 | A1 * | 2/2018 | Martirosyan | G05D 1/0094 |
| 2018/0103208 | A1 * | 4/2018 | Jung | H04N 5/2259 |
| 2018/0113462 | A1 * | 4/2018 | Fenn | G05D 1/0094 |
| 2018/0367733 | A1 * | 12/2018 | Sun | H04N 5/23267 |

* cited by examiner

*Primary Examiner* — Cynthia Segura
(74) *Attorney, Agent, or Firm* — Young Basile Hanlon & MacFarlane, P.C.

(57) ABSTRACT

The disclosure describes systems and methods for stabilizing an imaging device with an image stabilization device. The image stabilization device includes sensors, one or more arms, one or more motors, and a control unit. The sensors provide sensor data including orientation data, angular velocity data, and acceleration data. Each of the motors is associated with a respective arm. The control unit is configured to set a setpoint of the imaging device to a default setpoint, receive sensor data from the sensors, determine whether a flip condition exists, in response to determining that the flip condition exists, fix the setpoint of the imaging device, and in response to determining that the flip condition does not exists, maintain the default setpoint of the imaging device by moving at least one of respective arms with one of the respective motors.

20 Claims, 6 Drawing Sheets

ADAPTIVE MODES OF OPERATION BASED ON USER INTENTION OR ACTIVITY

TECHNICAL FIELD

The present disclosure relates generally to image stabilization, for example, by a gimbal, and more specifically to adapting the stabilization profile based on a detected activity.

BACKGROUND

An image stabilization device (e.g., a gimbal) is used in conjunction with an imaging device (e.g., a camera) so that media (e.g., still images or video sequences) captured by the imaging device are smooth and/or shake-free. For example, without an image stabilization device, a video captured by a mountain biker (such as via a camera worn by the mountain biker or attached to the mountain bike) can be jumpy and/or include a significant amount of vibration. On the other hand, if the camera is attached to an image stabilization device during capture of the video, the image stabilization device cancels the external movements thereby stabilizing the camera and resulting in a smooth video.

SUMMARY

One aspect of the disclosure is an image stabilization device for stabilizing an imaging device. The image stabilization device includes sensors, one or more arms, one or more motors, and a control unit. The sensors provide sensor data including orientation data, angular velocity data, and acceleration data. Each of the motors is associated with a respective arm. The control unit is configured to set a setpoint of the imaging device to a default setpoint, receive sensor data from the sensors, determine whether a flip condition exists, in response to determining that the flip condition exists, fix the setpoint of the imaging device, and in response to determining that the flip condition does not exists, maintain the default setpoint of the imaging device by moving at least one of respective arms with one of the respective motors.

Another aspect of the disclosure is an image stabilization device for stabilizing an imaging device. The image stabilization device includes sensors, one or more motors, and a control unit. The sensors provide sensor data including orientation data, angular velocity data, and acceleration data. Each motor is associated with a respective arm. The control unit is configured to set a setpoint of the imaging device to a default setpoint, receive sensor data from the sensors, in response to the sensor data, maintain the default setpoint of the imaging device by moving at least one of respective arms with one of the respective motors, identify, based on an exceptional movement in at least one of a yaw direction, a pitch direction, and a roll direction of the image stabilization device, an activity, and operate the motors of the image stabilization device according to an activity profile associated with the activity.

Another aspect of the disclosure is a method for stabilizing an imaging device with an image stabilization device. The method includes operating, based on sensor data, motors of the image stabilization device to stabilize the imaging device, identifying, based on an exceptional movement of the image stabilization device in at least one of a yaw direction, a pitch direction, and a roll direction, an activity, and operating the motors of the image stabilization device according to an activity profile associated with the activity.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a," "an," and "the" include plural referents unless the context clearly dictates otherwise.

BRIEF DESCRIPTION OF THE DRAWINGS

The disclosed embodiments have other advantages and features that will be more readily apparent from the detailed description, the appended claims, and the accompanying figures. A brief introduction of the figures is below.

DETAILED DESCRIPTION

As mentioned above, an image stabilization device can be used to stabilize an imaging device so that media captured by the imaging device are smooth. Using sensors (e.g., gyroscopes, accelerometers, and the like), the image stabilization device operates its motors to keep the imaging device in a default setpoint (i.e., orientation) and/or to cancel external movements (e.g., vibration) acting on the imaging device such that the default orientation is maintained. For example, the image stabilization device can keep the imaging device leveled with the horizon. For example, the image stabilization device can cancel the up-and-down bounces of a runner who may be wearing the imaging device.

In some situations, canceling all external movements and/or maintaining a default orientation of the imaging device may not be desirable. For some activities, it is desirable to capture distinguishing aspects of those activities rather than stabilize the imaging device. For example, rather than maintaining the default setpoint (e.g., level with the horizon), it may be desirable to capture a back flip during, e.g., a ski activity. For example, rather than maintaining the default orientation (e.g., level with the horizon), it may be desirable to capture a leaning-into-a-curve action during, e.g., a motor cycling activity. For example, rather than maintaining the default orientation (e.g., to follow an object), it may be desirable to predict that the user (e.g., an operator of the image stabilization device), intends to follow another object and/or to reset the default orientation.

This disclosure describes improved stabilization techniques that adapt the mode of operation (e.g., the stabilization profile) of an image stabilization device based on user intention and/or user activity. By adapting the mode of operation, media (e.g., images, video, etc.) captured by an image capture device can simultaneously be stable and capture unique aspects of the user activity or user intention.

The present technology will now be described in detail with reference to the drawings that are provided as illustrative examples to enable those skilled in the art to practice the technology. The figures and examples below are not meant to limit the scope of the present disclosure to a single implementation or embodiment, but other implementations and embodiments are possible by way of interchange of or combination with some or all of the described or illustrated elements. Wherever convenient, the same reference numbers will be used throughout the drawings to refer to same or like parts.

Figure 1A:
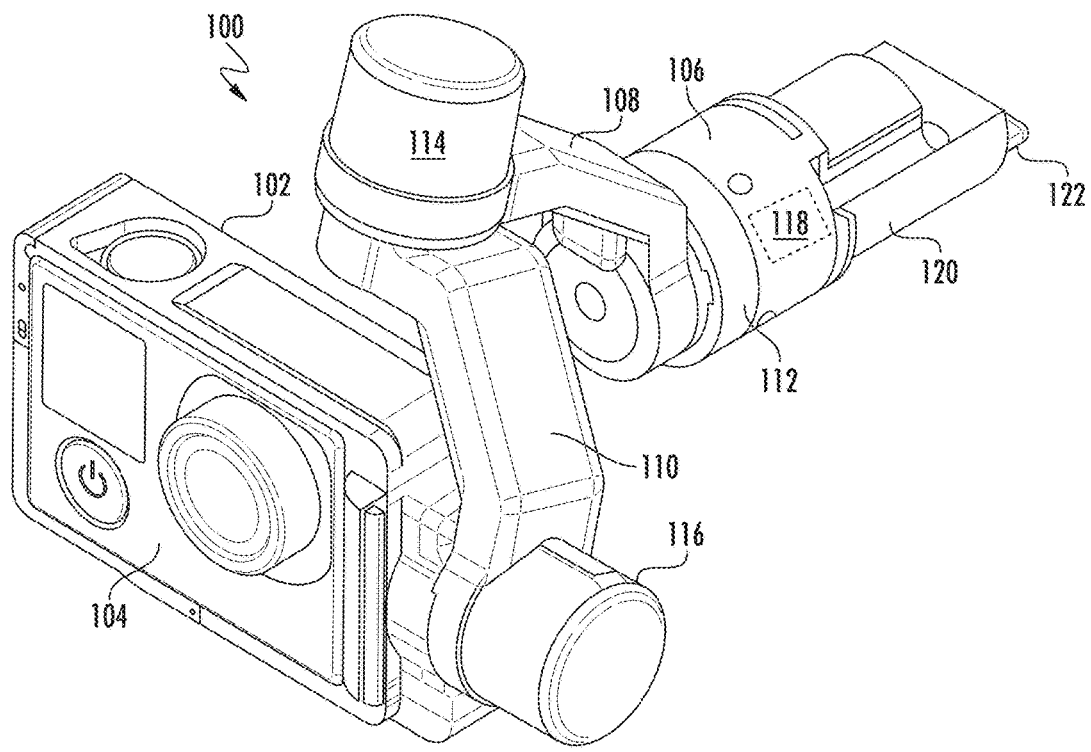
FIG. 1A shows an example of a three-axis image stabilization device according to implementations of this disclosure.

FIG. 1A shows an example of a three-axis image stabilization device. In this example, the three-axis stabilization mechanism is a gimbal 100. A frame 102 that secures an imaging device 104 is removably coupled to the gimbal 100. The gimbal 100 includes three arms, a first arm 106, a second arm 108, and a third arm 110. The gimbal 100 also includes three motors, a first motor 112, a second motor 114, and a third motor 116, each associated with one or more of the arms 106, 108, 110, for example, at junctures between the arms 106, 108, 110. Each of the motors 112, 114, 116 may include one or more encoders (not shown) that detect axial rotation.

In the example of FIG. 1A, the first motor 112 is integral with the first arm 106. A first end of the second arm 108 is connected to the first arm 106 and the first motor 112. A second end of the second arm 108 is connected to the second motor 114 and a first end of the third arm 110. A second end of the third arm 110 is connected to the third motor 116 and the removable frame 102 securing the imaging device 104. The sequential connections of arms 106, 108, 110 and motors 112, 114, 116 allows for three-axis rotation and control of a mounted object, such as the imaging device 104, in space.

The gimbal 100 operates to maintain the imaging device 104 in a specified orientation. When the gimbal 100 and the imaging device 104 are attached to a platform (e.g., a UAV, a handheld grip, or another platform) that moves in space, the imaging device 104 remains generally motionless in respect to the platform. The gimbal 100 may include a control system 118, either on-board or remote, that provides commands to the motors 112, 114, 116 to maintain the specified orientation of the imaging device 104 based, for example, on information received from sensors (not shown) that indicate instantaneous values for or changes in orientation of the imaging device 104 in respect to each of three axes of rotation (e.g., pitch, roll, and yaw). The specified orientation for the imaging device 104 may be based on: user-provided inputs or settings; sensor-provided information; a presence of a horizon, a tracked object, or other features detected in an image captured by the imaging device 104; an orientation of the gimbal 100 in respect to the platform; or any combination or extension of the preceding elements.

Each of the motors 112, 114, 116 may control orientation of the imaging device 104 about a single axis (e.g., pitch, roll, or yaw), for example, when orientation of the rotational axes of the motors 112, 114, 116 is orthogonal. The axis controlled by each of the motors 112, 114, 116 may depend on the type of platform to which the gimbal 100 is attached. For example, when the gimbal 100 is attached to a UAV, the first motor 112 may rotate the imaging device 104 about a roll axis, the second motor 114 may rotate the imaging device 104 about a yaw axis, and the third motor 116 may rotate the imaging device 104 about a pitch axis. In another example, when the gimbal 100 is attached to a handheld grip, the first motor 112 may rotate the imaging device 104 about a yaw axis, the second motor 114 may rotate the imaging device 104 about a roll axis, and the third motor 116 may rotate the imaging device 104 about a pitch axis.

Some of the motors 112, 114, 116 may control orientation of the imaging device 104 about more than one of the axes (e.g., pitch, roll, and yaw), for example, when orientation of some of the rotational axes of the motors 112, 114, 116 are not orthogonal. In the gimbal 100 shown in FIG. 1A, the first motor 112 and the third motor 116 have axes of rotation that are orthogonal, and the second motor 114 and the third motor 116 have axes of rotation that are orthogonal, but the first motor 112 and second motor 114 have axes of rotation that are not orthogonal. In this example, the first motor 112 may adjust only roll, and the third motor 116 may adjust only pitch, but the second motor 114 may adjust yaw primarily, but also pitch and roll secondarily. This configuration of the gimbal 100, where some of the motors 112, 114, 116 control orientation of the imaging device 104 about more than one of the axes, can allow for a larger field of view for the imaging device 104 while reducing obstructions in the field of view.

The gimbal 100 may include an attachment arm 120 coupled to the first arm 106, the first motor 112, or both, that allows the gimbal 100 to be mounted to a platform (e.g., a UAV, a handheld grip, or any other platform). The attachment arm 120 may be selectively removable. In other examples (not shown), the attachment arm 120 may be coupled to the second arm 108, the third arm 110, the second motor 114, the third motor 116, or any combination thereof. The attachment arm 120 can include a portion of a locking mechanism (not shown) to securely attach the gimbal 100 to a complementary portion of the locking mechanism (not shown) disposed on a platform (e.g., a UAV, a handheld grip, or any other platform). The locking mechanism may include male and female components, frictional components, clamping components, or any other suitable components to achieve locked coupling of the gimbal 100 and the platform.

The gimbal 100 and/or the attachment arm 120 may include a connector 122 for the gimbal 100 to electronically couple to one or more platforms (e.g., a UAV, a handheld grip, or any other platform). The connector 122 may provide power to the gimbal 100 and/or the imaging device 104 mounted in the frame 102. The connector 122 may enable communication between the control system 118 associated with the gimbal 100 and various sensors and/or controllers (not shown) associated with the platform to which the gimbal 100 is mounted.

Though FIG. 1A shows one size and shape for the frame 102 and the imaging device 104, the gimbal 100 may be designed to work with a variety of frame and imaging device combinations. The control system 118 may use different algorithms or control parameters to control the motors 112, 114, 116 based on a mass, center of gravity, and/or moment of inertia for a particular frame and imaging device combination coupled to the gimbal 100. For example, control parameters can include allowed minimums, maximums, and/or ranges for acceleration, velocity, torque, and/or voltage for the motors 112, 114, 116 given identification of the coupled imaging device and frame.

Figure 1B:
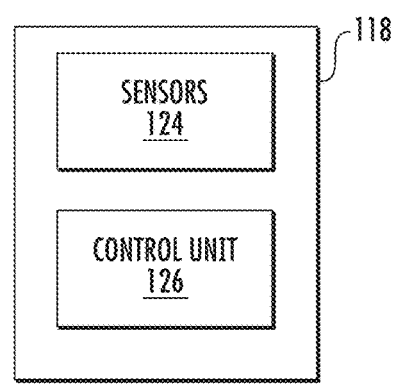
FIG. 1B shows a control system for the three-axis image stabilization device of FIG. 1A according to implementations of this disclosure.

FIG. 1B shows the control system 118 for the gimbal 100 of FIG. 1A. The control system 118 for the gimbal 100 includes one or more sensors 124 and a control unit 126. The sensors 124 may include: accelerometers, gyroscopes, and magnetometers within an inertial measurement unit (IMU) that determine rotation, orientation, and acceleration; rotary encoders that detect angular position of the motors 112, 114, 116; and a separate magnetometer to detect magnetic fields applied to the gimbal 100. Though a manufacturer may calibrate these sensors 124 upon production, inclusion of the sensors 124 in various packaging configurations and at various locations within a manufactured product such as the gimbal 100 may require additional and/or occasional calibration to account for stresses, both mechanical and thermal, that occur during manufacture, operation, and/or storage of the gimbal 100.

The control unit 126 may receive information from the various sensors 124 indicative of instantaneous orientation, angular velocity, and acceleration of various portions of the gimbal 100, such as each of the arms 106, 108, 110. The control unit 126 may use this information to apply a control algorithm that dictates angular rotation for the motors 112, 114, 116 to achieve a desired orientation for the imaging device 104 in respect to at least one of three rotational axis (e.g., pitch, roll, and yaw). The control algorithm can also account for a variety of imaging device and frame combinations of varying masses and moments of inertia. Based on the control algorithm, the control unit 126 may send commands to the motors 112, 114, 116 of the gimbal 100 to adjust the orientation of the imaging device 104.

Figure 2A:
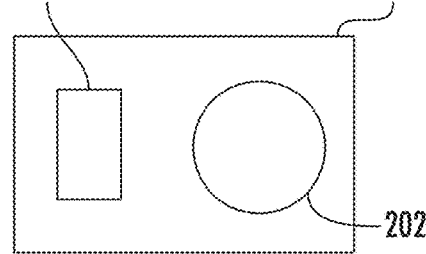
FIG. 2A shows an example of an imaging device for use with the image stabilization device of FIG. 1A according to implementations of this disclosure.

FIG. 2A shows an example of an imaging device 200 for use with the gimbal 100 of FIG. 1A. The imaging device 200 may be a GoPro Hero4®, Hero5®, or Hero6® camera, however, any type of imaging device that can be coupled to the gimbal 100 may be utilized. The imaging device 200 may be of the same type or a different type than the imaging device 104 of FIG. 1A. The imaging device 200 may include still image and video capture capabilities. The imaging device 200 may include a lens 202, a display screen 204, and a control unit (not shown). Means for coupling the imaging device 200 to the frame 102 for use with the gimbal 100 of FIG. 1A are not shown.

Figure 2B:
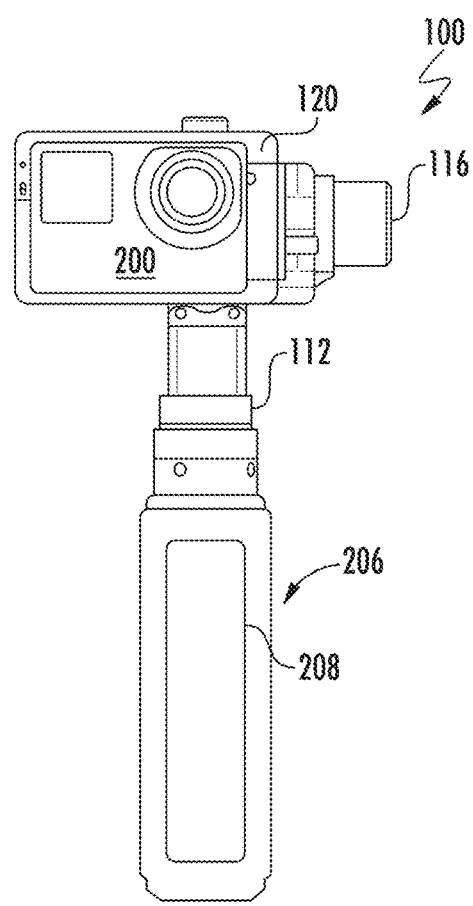
FIG. 2B shows an example of a handheld grip for use with the image stabilization device of FIG. 1A and the imaging device of FIG. 2A according to implementations of this disclosure.

FIG. 2B shows an example of a handheld grip 206 for use with the gimbal 100 of FIG. 1A and the imaging device 200 of FIG. 2A. The handheld grip 206 is one example of a platform that may support the gimbal 100 mechanically as well as communicate with the gimbal 100 electronically. The handheld grip 206 may include a user interface 208 that receive inputs from a user to control the gimbal 100, the imaging device 200, and/or the handheld grip 206. The handheld grip 206 may include a battery (not shown) or other power source to power the gimbal 100, the imaging device 200, and/or the handheld grip 206.

The handheld grip 206 may include a control unit (not shown) and/or storage capabilities such that image content from the imaging device 200 may be processed or stored within the handheld grip 206. The handheld grip 206 may include a port (not shown) to connect to another device, such as a mobile device or smart phone, that allows communication of image content or other information to/from the imaging device 200 and/or the handheld grip 206. The user interface 208 on the handheld grip 206 may also include a display or other visual indicator indicative of a mode of operation associated with the coupled gimbal 100 and/or the coupled imaging device 200.

Figure 2C:
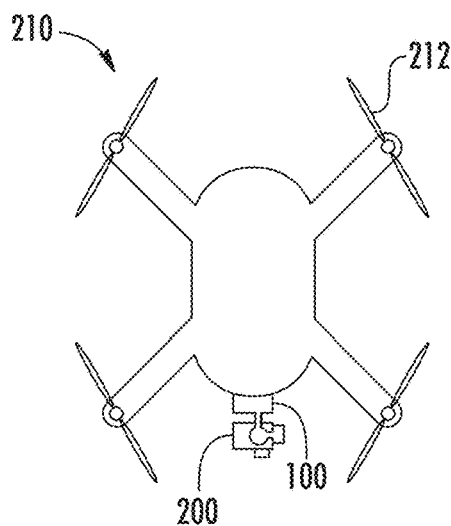
FIG. 2C shows an example of a UAV for use with the image stabilization device of FIG. 1A and the imaging device of FIG. 2A according to implementations of this disclosure.

FIG. 2C shows an example of a UAV 210 for use with the gimbal 100 of FIG. 1A and the imaging device 200 of FIG. 2A. In this embodiment, the UAV 210 has a quad-copter configuration, that is, the UAV 210 includes four rotors 212. Each rotor 212 is driven by a separate electric motor (not shown). However, the UAV 210 may be any form of an aerial vehicle. A battery pack (not shown) mounted on or in a body of the UAV 210 may supply electrical power to all four electric motors, flight electronics (not shown) associated with operation of UAV 210, and the imaging device 200 of FIG. 2A to provide still and video images by means of a communication link (not shown) to a ground-based user. The imaging device 200 may be coupled to a front of the UAV 210 using the gimbal 100 of FIG. 1A.

Figure 2D:
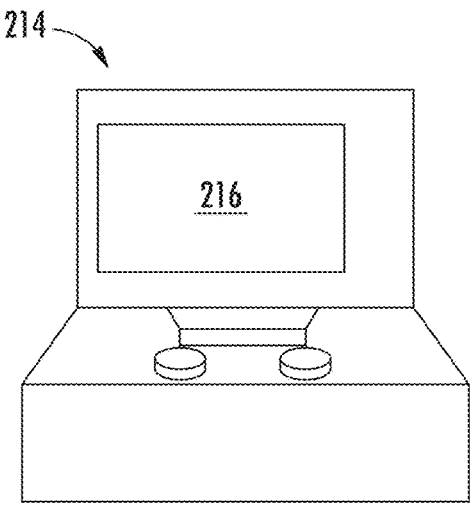
FIG. 2D shows an example of a remote controller for the UAV of FIG. 2C according to implementations of this disclosure.

FIG. 2D shows an example of a remote controller 214 for the UAV 210 of FIG. 2C. The remote controller 214 includes a user interface 216 for operating the UAV 210. The remote controller 214 may include a communications interface (not shown) via which the remote controller 214 may receive and send commands related to operation of the gimbal 100, the imaging device 200, the handheld grip 206, and/or the UAV 210. The commands can include movement commands, configuration commands, operational control commands, calibration commands, and imaging commands. In some implementations, the remote controller 214 may be a smartphone, a tablet computer, a phablet, a smart watch, a portable computer, and/or another device configured to receive user inputs and communicate information with the gimbal 100, imaging device 200, the handheld grip 206, and/or the UAV 210.

For example, flight direction, attitude, and altitude of the UAV 210 may all be controlled by controlling speeds of the motors that drive the respective rotors 212 of the UAV 210. During flight, a GPS receiver on the UAV 210 may provide navigational data to the remote controller 214 for use in determining flight paths and displaying current location through the user interface 216. A vision-based navigation system may also be implemented that tracks visually significant features through image data captured by the imaging device 200 to provide the necessary speed and position of the UAV 210 to the remote controller 214.

The communications interface may utilize any wireless interface configuration, e.g., WiFi, Bluetooth (BT), cellular data link, ZigBee, near field communications (NFC) link, e.g., using ISO/IEC 14443 protocol, ANT+ link, and/or other wireless communications link. In some implementations, the communications interface may be effectuated using a wired interface, e.g., HDMI, USB, digital video interface, display port interface (e.g., digital display interface developed by the Video Electronics Standards Association (VESA), Ethernet, Thunderbolt), and/or other interface.

The remote controller 214 may operate a software application configured to perform a variety of operations related to camera configuration, positioning and/or calibration of the gimbal 100, control of video acquisition, and/or display of video captured by the imaging device 200 through the user interface 216. An application may enable a user to create short video clips and share video clips to a cloud service (e.g., Instagram®, Facebook®, YouTube®, Dropbox®); perform full remote control of functions of the imaging device 200; live preview video being captured for shot framing; mark key moments while recording for location and/or playback of video highlights; wirelessly control camera software; and/or perform other functions. Various methodologies may be utilized for configuring the imaging device 200 and/or displaying the captured information.

Figure 3:
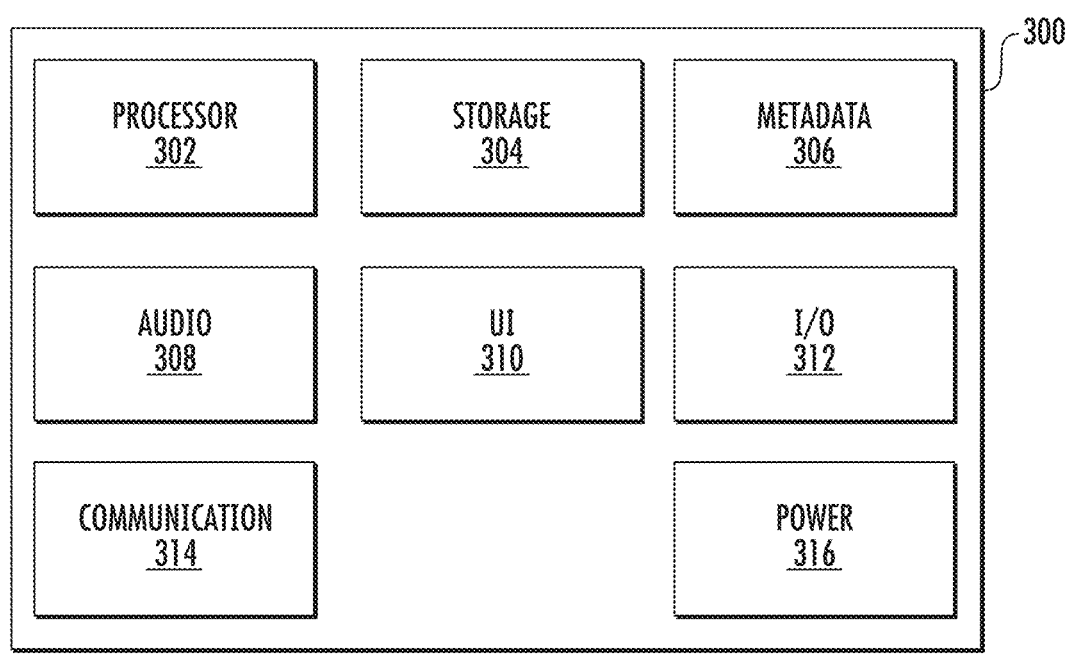
FIG. 3 is a block diagram illustrating components of a computing device according to implementations of this disclosure.

FIG. 3 is a block diagram illustrating components of a computing device 300. The computing device 300 may be a single component of the gimbal 100, the imaging device 200, the handheld grip 206, the UAV 210, or the remote controller 214. The computing device 300 may be multiple computing devices distributed in various ways between the gimbal 100, the imaging device 200, the handheld grip 206, the UAV 210, or the remote controller 214. In the examples described, the computing device 300 may provide communication and control functions to the various components described in reference to FIGS. 2A, 2B, 2C, and 2D.

The computing device 300 may include a processor 302. The processor 302 may include a system on a chip (SOC), microcontroller, microprocessor, CPU, DSP, ASIC, GPU, or other processors that control the operation and functionality of the gimbal 100, the imaging device 200, the handheld grip 206, the UAV 210, and/or the remote controller 214. The processor 302 may interface with mechanical, electrical, sensory, and power modules via driver interfaces and software abstraction layers. Additional processing and memory capacity may be used to support these processes. These components may be fully controlled by the processor 302. In some implementations, one or more components may be operable by one or more other control processes (e.g., a GPS receiver may include a processing apparatus configured to provide position and motion information to the processor 302 in accordance with a given schedule (e.g., values of latitude, longitude, and elevation at 10 Hz.))

The computing device 300 may also include electronic storage 304 in which configuration parameters, image data, and/or code for functional algorithms may be stored. The electronic storage 304 may include a system memory module that is configured to store executable computer instructions that, when executed by the processor 302, control various functions of the gimbal 100, the imaging device 200, the handheld grip 206, the UAV 210, and/or the remote controller 214. The electronic storage 304 may also include storage memory configured to store content (e.g., metadata, frames, video, and audio) captured by the imaging device 200 or sensors associated with the gimbal 100, the imaging device 200, the handheld grip 206, the UAV 210, and/or the remote controller 214.

The electronic storage 304 may include non-transitory memory configured to store configuration information and processing code configured to enable video information and metadata capture. The configuration information may include capture type (video, frames), image resolution, frame rate, burst setting, white balance, recording configuration (e.g., loop mode), audio track configuration, and other parameters that may be associated with audio, video, and metadata capture. Additional electronic storage 304 may be available for other hardware, firmware, or software needs of the gimbal 100, the imaging device 200, the handheld grip 206, the UAV 210, and/or the remote controller 214. The memory and processing capacity may aid in management of processing configuration (e.g., loading, replacement) operations during a startup and/or other operations.

The computing device 300 may include or be in communication with metadata sources 306. The metadata sources 306 may include sensors associated with the gimbal 100, the imaging device 200, the handheld grip 206, the UAV 210, and/or the remote controller 214. The sensors may include an inertial measurement unit (IMU), an accelerometer, a gyroscope, a barometer, a magnetometer, a compass, a LIDAR sensor, a global positioning satellite (GPS) receiver, an altimeter, an ambient light sensor, a temperature sensor, a pressure sensor, a heart rate sensor, a depth sensor (such as radar, an infra-red-based depth sensor, such as a Kinect-style depth sensor, and a stereo depth sensor), and/or other sensors. The imaging device 200 may also provide metadata sources 306, e.g., image sensors, a battery monitor, storage parameters, and other information related to camera operation and capture of content. The metadata sources 306 may obtain information related to an environment of the handheld grip 206 and/or the UAV 210 and aspects in which the content is captured.

By way of a non-limiting example, an accelerometer may provide motion information including acceleration vectors from which velocity vectors may be derived, and a barometer may provide pressure information from which elevation may be derived. A gyroscope may provide orientation information, a GPS sensor may provide GPS coordinates and time for identifying location, and an altimeter may obtain altitude information. The metadata sources 306 may be rigidly coupled to the gimbal 100, the imaging device 200, the handheld grip 206, the UAV 210, and/or the remote controller 214 such that the processor 302 may be operable to synchronize various types of information received from various types of metadata sources 306.

For example, using timing information, metadata information may be related to content (frame or video) captured by an image sensor. In some implementations, the metadata capture may be decoupled from the video or frame capture. That is, metadata may be stored before, after, and in-between one or more video clips or frames. In one or more implementations, the processor 302 may perform operations on the received metadata to generate additional metadata information. For example, the processor 302 may integrate received acceleration information to determine a velocity profile of the imaging device 200 during a recording of a video.

The computing device 300 may include or be in communication with audio sources 308, such as one or more microphones, configured to provide audio information that may be associated with images acquired by the imaging device 200 or commands provided by the remote controller 214. Two or more microphones may be combined to form a microphone system that is directional. Such a directional microphone system can be used to determine the location of a sound source and to eliminate undesirable noise originating in a particular direction. Various audio filters may be applied as well. In some implementations, audio information may be encoded using AAC, AC3, MP3, linear PCM, MPEG-H, and other audio coding formats (audio codec). In one or more implementations of spherical video and audio, the audio codec may include a 3-dimensional audio codec.

The computing device 300 may include or be in communication with a user interface (UI) 310. The UI 310 may include a display configured to provide information related to operation modes (e.g., camera modes, flight modes), connection status (e.g., connected, wireless, wired), power modes (e.g., standby, sensor, video), metadata sources 306 (e.g., heart rate, GPS, barometric), and/or other information associated with the gimbal 100, the imaging device 200, the handheld grip 206, the UAV 210, and/or the remote controller 214. In some implementations, the UI 310 may include virtually any device capable of registering inputs from and communicating outputs to a user. These may include, without limitation, display, touch, gesture, proximity, light, sound receiving/emitting, wired/wireless, and/or other input/output devices. The UI 310 may include a display, one or more tactile elements (e.g., joysticks, switches, buttons, and/or virtual touch screen buttons), lights (LED), speaker, and/or other interface elements.

The UI 310 may be configured to enable the user to provide commands to the gimbal 100, the imaging device 200, the handheld grip 206, the UAV 210, and/or the remote controller 214. For example, the user interface 216 shown in FIG. 2D is one example of the UI 310. User commands provided using the UI 310 may be encoded using a variety of approaches, including but not limited to duration of a button press (pulse width modulation), number of button presses (pulse code modulation), or a combination thereof. For example, two short button presses through the UI 310 may initiate a sensor acquisition mode. In another example, a single short button press may be used to communicate (i) initiation of video or frame capture and cessation of video or frame capture (toggle mode) or (ii) video or frame capture for a given time duration or number of frames (burst capture). Other user command or communication implementations may also be realized, such as one or more short or long button presses or toggles of a joystick.

The computing device 300 may include an input/output (I/O) module 312. The I/O module 312 may be configured to synchronize the imaging device 200 with the remote controller 214, a second capture device, a smartphone, and/or a video server. The I/O module 312 may be configured to communicate information to and from various I/O components. The I/O module 312 may include a wired or wireless communications interface (e.g., Wi-Fi, Bluetooth, USB, HDMI, Wireless USB, Near Field Communication (NFC), Ethernet, a radio frequency transceiver, and other interfaces) configured to communicate to one or more external devices. The I/O module 312 may interface with LED lights, a display, a button, a microphone, speakers, and other I/O components. In one or more implementations, the I/O module 312 may be coupled to an energy source such as a battery or other DC electrical source.

The computing device 300 may include a communication module 314 coupled to the I/O module 312. The communication module 314 may include a component (e.g., a dongle) having an infrared sensor, a radio frequency transceiver and antenna, an ultrasonic transducer, and/or other communications interfaces used to send and receive wireless communication signals. In some implementations, the communication module 314 may include a local (e.g., Bluetooth, Wi-Fi) or broad range (e.g., cellular LTE) communications interface configured to enable communications between the gimbal 100, the imaging device 200, the handheld grip 206, the UAV 210, and/or the remote controller 214.

The communication module 314 may employ communication technologies including one or more of Ethernet, 802.11, worldwide interoperability for microwave access (WiMAX), 3G, Long Term Evolution (LTE), digital subscriber line (DSL), asynchronous transfer mode (ATM), InfiniBand, PCI Express Advanced Switching, and/or other communication technologies. By way of non-limiting example, the communication module 314 may employ networking protocols including one or more of multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and/or other networking protocols.

Information exchanged over the communication module 314 may be represented using formats including one or more of hypertext markup language (HTML), extensible markup language (XML), and/or other formats. One or more exchanges of information between the imaging device 200 and outside devices, such as the remote controller 214, may be encrypted using encryption technologies including one or more of secure sockets layer (SSL), transport layer security (TLS), virtual private networks (VPNs), Internet Protocol security (IPsec), and/or other encryption technologies.

The computing device 300 may include a power system 316 that may moderate a power supply based on the needs of the gimbal 100, the imaging device 200, the handheld grip 206, the UAV 210, and/or the remote controller 214. For example, a battery, solar cell, inductive (contactless) power source, rectification, or other power supply housed within the handheld grip 206 and/or the UAV 210 may be controlled by the power system 316 to supply power for the gimbal 100 and/or the imaging device 200 when in a coupled state as shown in FIGS. 2B and 2C.

Figure 4:
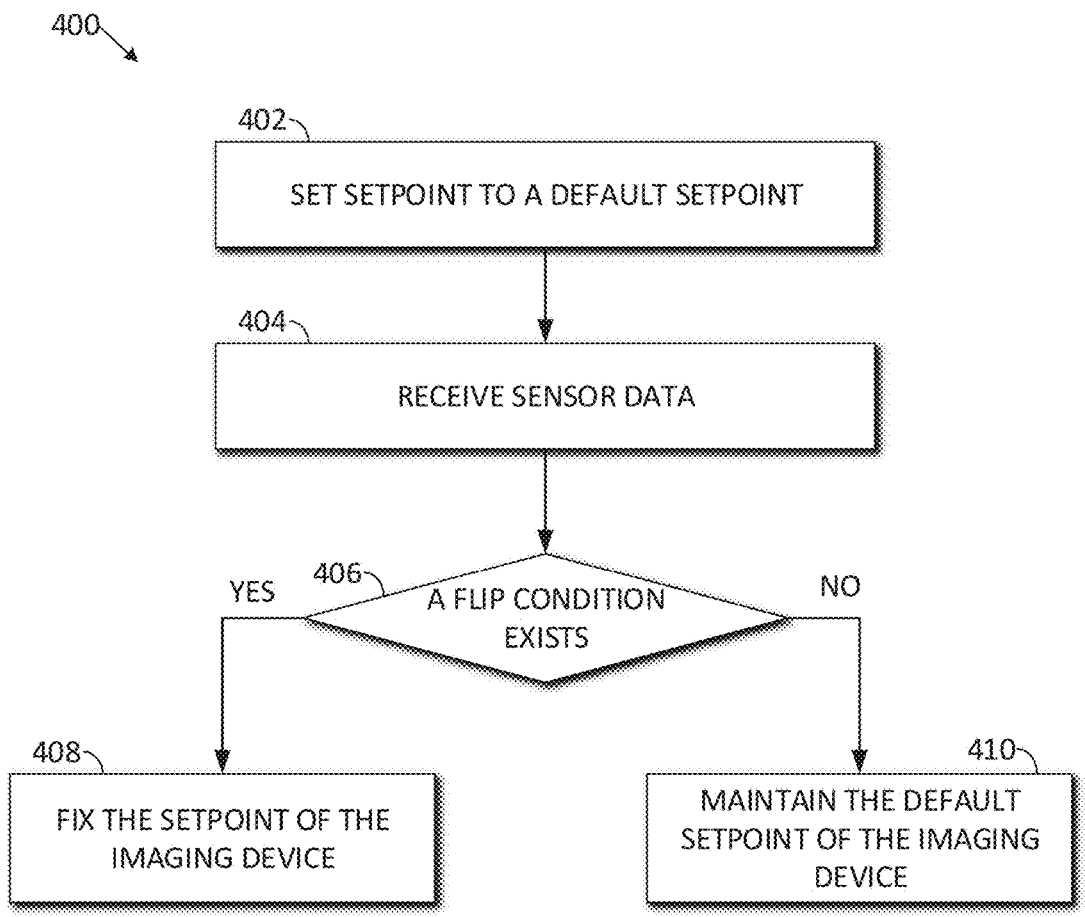
FIG. 4 is a flowchart of a process for stabilizing an imaging device according to an implementation of this disclosure.

As mentioned above, an image stabilization device can include motors. The motor workspace of the image stabilization device may be limited. That is, the range of motion of at least some of the motors of the image stabilization device may be limited. Depending on the orientation of a base link, the image stabilization device may invert (i.e., flip) an attached imaging device to achieve an image that is, for example, level with the horizon. The base link refers to a platform that is used to maneuver the image stabilization device. For example, the base link may be the handled grip 206 of FIG. 2B or the UAV 210 of FIG. 2C. For some activities (e.g. ski, snowboard, motocross) that involve flips (e.g., 360° pitch rotation), maintaining the imaging device at a default setpoint (e.g., level with the horizon) may not be according to a user's intentions and may result in a non-smooth video. FIG. 4 describes a process whereby the image stabilization device can detect the activity (i.e., that a user is performing a flip) and can turn off camera flipping.

FIG. 4 is a flowchart of a process 400 for stabilizing an imaging device according to an implementation of this disclosure. The imaging device can be the imaging device 104 of FIG. 1A. The imaging device can be stabilized by an image stabilization device, such as the gimbal 100 of FIG. 1A. As described above with respect to the gimbal 100, the image stabilization device can include sensors, such as the sensors 124 of FIG. 1B, for providing sensor data to a control unit, such as the control unit 126 of FIG. 1B. The sensor data can include orientation data, angular velocity data, and acceleration data provided by one or more accelerometers, gyroscopes, and/or magnetometers as described above. The image stabilization device can include one or more arms and one or more motors. Each motor can be associated with a respective arm as described above with respect to FIG. 1A. The process 400 can be performed by the control unit of the image stabilization device to stabilize the imaging device.

As indicated above, at least some of the motors of the image stabilization device can have respective limits (also referred to as motor hard stops). That is, some of the motors can have respective limited ranges of motion. A motor may be able to turn (i.e., stabilize) the imaging device up to the motor hard stop. For example, as the attachment arm 120 of FIG. 1A is moved up (or down) (for example by an operator holding the attachment arm 120), one or more of the motors 112, 114, 116 are operated to move one or more of the other arms so that the pitch of the imaging device is maintained at the default setpoint. When the attachment arm 120 is moved beyond its range of motion, the image stabilization device may rotate the imaging device so that the default set point is maintained. This can result in jerkiness in the media captured by the imaging device.

Figure 6A:
FIGS. 6A-6E are examples of activities according to implementation of this disclosure.
Figure 6B:
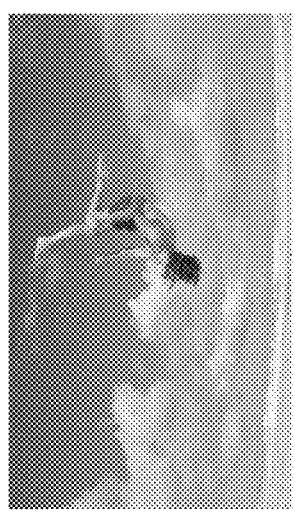

To illustrate the above-described scenario, reference is now made to FIGS. 6A-6B. FIGS. 6A-6B are examples of activities involving a back flip. FIG. 6A illustrates a skier performing a back flip and FIG. 6B illustrates another user (a non-skier) performing a back-flip. An imaging device attached to an image stabilization device can be attached to each of the users of FIGS. 6A-6B. For the purposes of this example, it is assumed that the default setpoint is such that the imaging device is to be maintained level with the horizon and that each of the users in FIGS. 6A-6B are moving in the East cardinal direction. As the users of FIGS. 6A-6B begin their back flips and are rotating vertically through space, the image stabilization device adjusts the pitch of the imaging device so that the imaging device is level with the horizon and points East. As the user continues rotating vertically, one of the motors of the image stabilization device reaches its hard stop and the image stabilization device operates its motors to flip the imaging device so that the imaging device remains level with the horizon (i.e., the default setpoint). However, the imaging device is now pointing West. Even if the rotation from East to West is smoothed, the imaging device does not capture the back-flip and captures an abrupt change of view point (i.e., from East to West).

The process 400 can overcome the limitations described above by determining that a flip condition exists and modifying the stabilization profile of the image stabilization device so that the image capture device captures the flip without discontinuity in point of view.

At operation 402, the process 400 sets a setpoint of the imaging device to a default setpoint. As used in this disclosure, "set" means to select, receive, construct, determine, specify, generate, or otherwise set in any manner whatsoever. Setpoint, as used herein, means a desired orientation. The default setpoint can be an orientation of the imaging device with respect to the horizon.

The default setpoint can be the setpoint that the image stabilization device sets when it is first turned on. For example, the sensors of the image stabilization device may be calibrated such that, when the image stabilization device is turned on, the motors of the image stabilization device are moved (e.g., by commands from the control unit) such that the imaging device assumes the default orientation setpoint (e.g., level with the horizon).

The default setpoint can be received from a user (e.g., an operator of the image stabilization device). That is, at any time during the operation of the image stabilization device, the user can provide the default setpoint or set the setpoint to a new default setpoint. In an example, the user can use the user interface 208 to set the default setpoint. In other examples, the user can remotely communicate the default setpoint to the image stabilization device. For example, the user can use a computing device, such as a computing device 300, or a remote controller, such as the remote controller 214, that is in communication with the image stabilization device to set the default setpoint. The user can use the user interface to set one or more of a desired default pitch angle, a default yaw angle, and default roll angle of the imaging device.

At operation 404, the process 400 receives sensor data from the sensors of the image stabilization device. "Receive" as used herein can mean poll, obtain, or any other way that the sensor data are received by or at the control unit. The sensor data can indicate the state of the image stabilization device. For example, the sensor data can include or be indicative of orientation data, angular velocity data, acceleration data, and/or angular positions of the motors. The sensor data can be received several times per second. For example, the sensor data can be received 10, 20, 100, or any other times per second.

At operation 406, the process 400 determines whether a flip condition exists. If the process 400 determines that a flip condition exists, the process 400 proceeds to operation 408; otherwise the process 400 proceeds to operation 410.

There are several examples of flip conditions. In one example, the flip condition can indicate that the image stabilization device is reaching or has reached a hard limit for at least one of the motors and, as such, the image stabilization device will cause the imaging device to be flipped (e.g., rotated). In another example, the flip condition can indicate that based on the sensor data, it is probable that an activity involving a flip is being performed and that the user intends that the flip be captured by the imaging device. For example, as the skier of FIG. 6A proceeds with the flip, the control unit of the image stabilization device can determine that, based on the trajectory of the skier, the imaging device is not to be flipped. The trajectory of the skier can be determined based on the pitch rotation and/or angular velocity, over time, of the platform of the image stabilization device.

To determine whether the flip condition exists, the process 400 can continuously receive and evaluate the sensor data. For example, as new sensor data are received, the new sensor data can be integrated with previously received sensor data to determine (e.g., increase or decrease) the probability of the existence of the flip condition. In an example, when the probability of the flip condition exceeds a threshold (e.g., 80%, 90%, or other threshold value), the process 400 determines that the flip condition exists.

In an example, determining whether the flip condition exists can include detecting that a g-force exceeds a threshold and determining that the flip condition exists based on the g-force exceeding the threshold. For example, when the g-force exceeds the threshold of 20% of a typical g-force (i.e., a g-force of driving onto a jump with skis) for a certain number of seconds (e.g., 0.5, 1, or 2, more, or less seconds), followed by a near zero acceleration (i.e., a near free-fall), then a flip condition can be determined to exist. The typical g-force can be learned based on an off-line analysis of various ski jumps. The typical g-force can be available (e.g., as a parameter) to the process 400. The threshold can be a value other than 20%. In an example, detecting that the g-force exceeds the threshold includes detecting the free fall condition (i.e., detecting a zero acceleration based on the movement of one or more of the sensors). Using the sensor data for each axis of the image stabilization device, the process 400 can compute and/or estimate respective orientations for each of the arms of the image stabilization device.

The respective orientations can be determined based on data from the IMU and rotary encoders described above. For example, the process 400 can determine that the flip condition exists when the g-force (e.g., the gravity vector) exceeding the threshold is continuously detected while the pitch angle of the imaging device continues to increase in a certain direction. That is, the combination of the g-force and the pitch angle, over time, can indicate that the flip condition exists. For example, the process 400 can determine that the flip condition exists when the platform (e.g., an arm) of the image stabilization device is following a predefined rotation path at an acceleration that is greater than a predefined acceleration value. The arm can be, for example, the handheld grip 206 of FIG. 2B.

In an example, the process 400 can determine that the flip condition exists when the motors of the image stabilization device controlling the pitch angle of the imaging device are reaching (e.g., within a threshold of) their respective hard limits and the g-force exceeds the threshold.

The image stabilization device may receive an image stream from the imaging device. The image stream refers to the media (i.e., still image and/or video sequences) captured by the imaging device. As used herein, "receive" can mean anyway that the image stream, or a portion thereof, is available to or accessible by the control unit such that the control unit can perform processing (e.g., object and/or scene detection) on the image stream or a portion thereof. For example, the control unit can access the image stream stored in the imaging device. For example, the control unit can receive the image stream as described above with respect to the handled grip 206, which is accessible to the control unit.

Figure 6C:
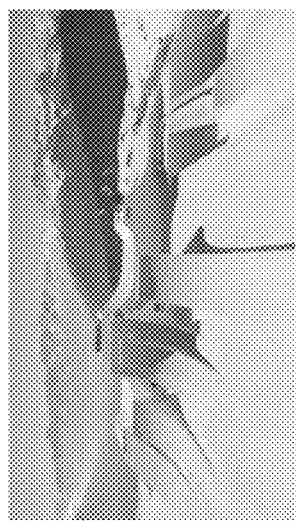

In an example, the image stream can be used to detect an activity indicative of the flip condition. For example, by analyzing the image stream, certain objects in the image stream can be indicative of an activity that can involve a flip of the imaging device. For example, the control unit can detect one or more objects in the image stream that are indicative of the flip condition. For example, the imaging device may capture and/or be oriented toward the scene in FIG. 6C. FIG. 6C depicts a ski slope and ski ramps. As such, the control unit can detect snow and ramps in FIG. 6C. These objects are indicative of the ski activity involving the flip of FIG. 6A. In an example, the process 400 can use the combination of detecting a structure and/or an object that may be a ramp along with an increasing (or decreasing) pitch angle to determine that the flip condition exists. As such, the image stream and the sensor data can be used in combination to determine whether the flip condition exists.

Feature detection techniques, visual recognition techniques, and/or image classification techniques known in the art can be used for detecting an object. For example, the control unit can be supplied with a model that recognizes (i.e., detects) objects and/or scenes indicative of a flip condition. For example, the model can be generated based on a training set of images and/or video sequences that includes some images, objects, and/or scenes that are indicative of a flip conditions and some that are not indicative of the flip condition.

In another example, the activity may be detected based on GPS data. The image stabilization device can include a GPS receiver. As such, the GPS data can be used to determine a location (e.g., a ski resort or a location of a sporting event) of the image stabilization device. The location can in turn be used to determine that an activity is likely to include a flip. Accordingly, the sensor data and the GPS location can be used in combination to determine that the flip condition exists.

At operation 408, the process 400, in response to determining that the flip condition exists, fixes the setpoint of the imaging device. That is, the control unit stops operating the motors of the image stabilization device to maintain the default setpoint of the imaging device. Fixing of the setpoint of the imaging device can mean immediately fixing the setpoint or fixing in a smoothed fashion.

The fixing may be immediate (e.g., abrupt). That is, as soon as the flip condition is detected, the control unit stops operating the motors of the image stabilization device to maintain the default setpoint of the imaging device. The fixing may be smoothed (e.g. controlled). That is, the process 400 may not include immediately stop operating the motors of the image stabilization device as soon as the flip condition is detected.

In some implementations, determining that a flip condition exists can be further based on user input. The user input can indicate whether the imaging device is to be flipped. In an example, the user can indicate (such as via the user interface) that the camera is itself to be flipped even if the control unit detects that the flip condition exists. That is, at operation 406, if the user indicates that the imaging device is to be flipped, then the process 400 proceeds to operation 410. That is, for example, even if a flip condition is detected such that, absent the user input, the process 400 proceeds to operation 408, the user input causes the process 400 not to proceed to operation 408. Instead the process 400 proceeds to operation 410. In an example, if the user indicates that the imaging device is to be flipped, then the process 400 does not determine whether a flip condition exists at operation 406 and proceeds to operation 410.

At operation 410, in response to determining that the flip condition does not exist, the process 400 maintains the default setpoint of the imaging device. For example, in response to the sensor data, the control unit can move at least one of the respective arms with one of the respective motors, so that the imaging device maintains the default setpoint. For example, the process 400 can move one or more motors to cancel the effect of high frequency vibrations before the vibrations reach the imaging device thereby affecting image quality. For example, the process 400 can move one or more of the motors to cancel the effect of un-intended movements of the image stabilization device.

Figure 5:
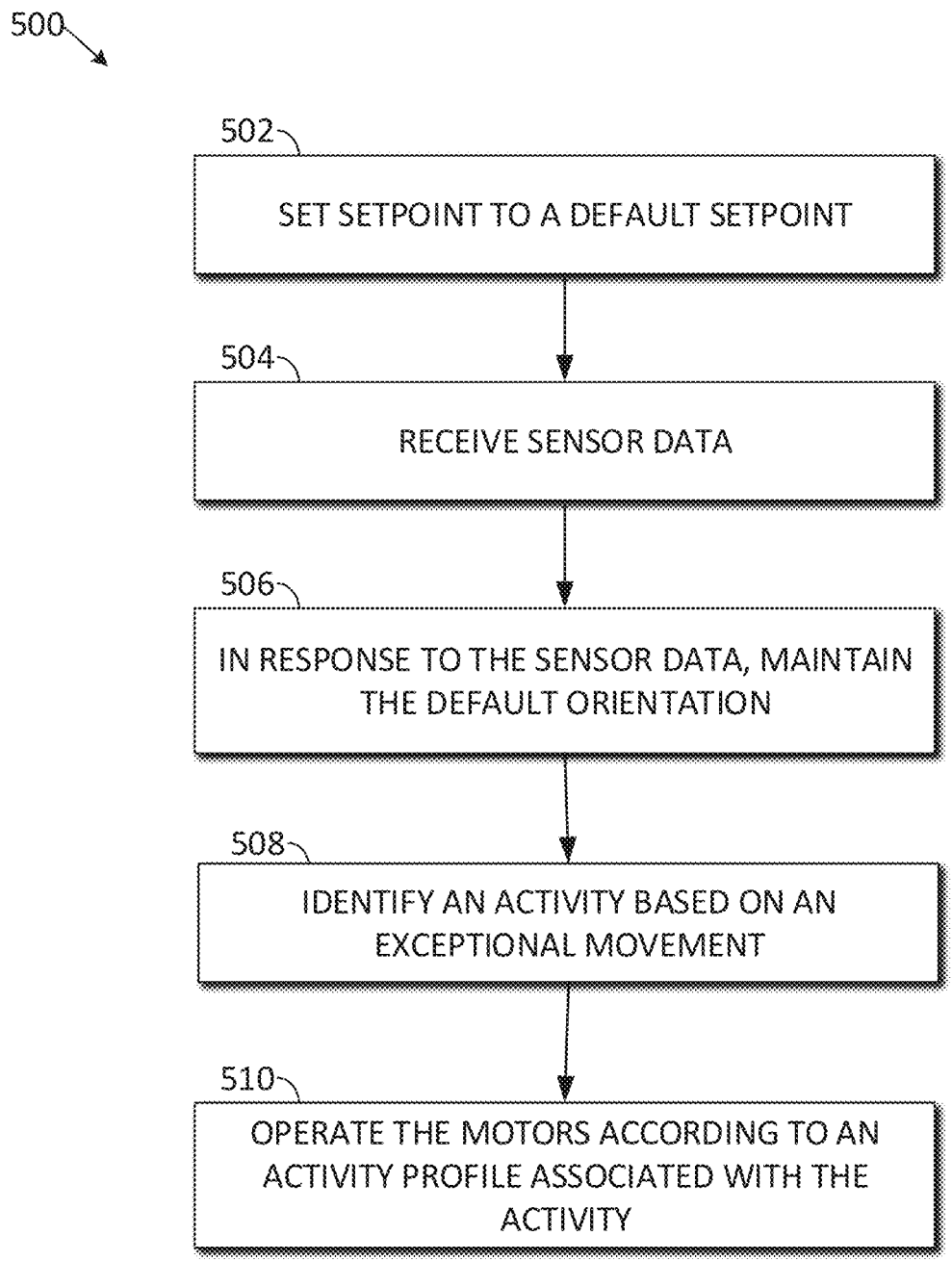
FIG. 5 is a flowchart of a process for stabilizing an imaging device according to another implementation of this disclosure.

FIG. 5 is a flowchart of a process 500 for stabilizing an imaging device according to another implementation of this disclosure. The imaging device can be the imaging device 104 of FIG. 1A. The imaging device can be stabilized by an image stabilization device, such as the gimbal 100 of FIG. 1A.

As described above with respect to the gimbal 100, the image stabilization device can include sensors, such as the sensors 124 of FIG. 1B, for providing sensor data to a control unit, such as the control unit 126 of FIG. 1B. The sensor data can include orientation data, angular velocity data, and acceleration data provided by one or more accelerometers, gyroscopes, and/or magnetometers as described above. The image stabilization device can include one or more arms and one or more motors. Each motor can be associated with a respective arm as described above with respect to FIG. 1A. The process 500 can be performed by the control unit of the image stabilization device to stabilize the imaging device.

The process 500 modifies a stabilization profile of the image stabilization device in response to detecting an exceptional movement. The exceptional movement can be one or more movements over time based upon which the control unit of the image stabilization device can infer a user intention and/or the presence of an activity which necessitate that the image stabilization device deviate from maintaining the default setpoint of the imaging device. When the exceptional movement is detected, the image stabilization device operates the motors of the image stabilization device according to an activity profile associated with the activity.

At operation 502, the process 500 sets a setpoint of the imaging device to a default setpoint. The setpoint can be set as described with respect to operation 402 of the process 400. At operation 504, the process 500 receives sensor data. The sensor data can be received as described with respect to operation 404 of the process 400.

At operation 506, in response to the sensor data, the process 500 maintains the default setpoint of the imaging device by moving at least one of the respective arms with one of the respective motors. The process 500 can maintain the default setpoint as described with respect to operation 410 of the process 400.

In an example of maintaining the default orientation at operation 506, the process 500 can count the number of oscillation movements in an orientation (e.g., one or more of pitch, roll, and yaw direction) in a specified timeframe. If the number of movements exceeds a threshold ( ) then the movements can be attributed to the environment and are thus canceled by image stabilization device. In an example, the threshold can be more than one (1) significant movement direction per second. For example, if the image stabilization device is mounted to a motorbike that is traveling at a high speed, then the image stabilization device can detect and cancel low frequency vibrations attributed to road conditions.

At operation 508, the process 500 identifies an activity based on an exceptional movement along at least one axis. The process 500 identifies the activity based on exceptional movement in at least one of the yaw direction, the pitch direction, and the roll direction of the image stabilization device. At operation 510, the process 500 operates the motors of the image stabilization device according to an activity profile associated with the activity. The activity profile can be an algorithm, a set of rules, or the like that the process 500 uses to control and/or adjust at least one of the yaw, pitch, and roll of the imaging device based on the activity.

In an example of identifying the activity based on the exceptional movement at operation 510, the exceptional movement can be an acceleration (e.g., a high acceleration) or a high velocity in the yaw orientation. As such, the process 500 can determine that the activity is a panning activity. Accordingly, the process 500 can infer, for example, that an operator of the image stabilization device intends to shift the focus from one point of view to another. That is, the process 500 can infer that the user intends for the yaw angle to follow the motion of the platform used to maneuver the image stabilization device in the yaw direction.

In an example, the process 500 can measure, using the sensor data, the motion of a platform (e.g., a handheld grip) to determine whether the motion of the handle is to be followed (i.e., whether to set a new setpoint in the yaw orientation). The motion of the platform can be based on the rotational velocities and accelerations of the platform and/or a curve motion profile of the platform (e.g., the trajectory of the handheld grip).

In some implementations, machine learning can be used to distinguish situations where the imaging device should follow in the yaw direction and situations where the imaging device should be smoothed (i.e., maintained in the default setpoint) in the yaw direction. The machine learning can be performed remote from (i.e., outside of) the image stabilization device.

The machine learning algorithm can be provided with a training data set that includes video sequences and corresponding handle motion profiles, rotational velocities, accelerations, and the like. The training set include any number of parameters, measurements, or sensor data. The training set can also include, for each of the video sequences, indications of whether the imaging device should follow or be smoothed in the yaw direction for the video sequence. The machine learning algorithm outputs a model. The model can be available to the process 500.

The model can receive (such as from a control unit) inputs such as a handle motion profile, rotational velocities, and accelerations, and outputs an indication of whether the process 500 is to follow or smooth the imaging device in the yaw angle. Any machine learning algorithm and model known in the art may be used. For example, any one or more of a decision tree, a neural network, a genetic algorithm, clustering, classification, and the like can be used. The model can be available in a memory (such as the storage 304 of FIG. 3) of or accessible to the image stabilization device. The model can be a set of rules executable by a processor (such as the processor 302 of FIG. 3) of the image stabilization device.

In the normal operation of the image stabilization device, the control unit cancels small movements detected by the sensors. For example, small movements due to shakiness of an operator of the image stabilization device are canceled before reaching the imaging device thereby affecting the quality of the captured media. Non limiting examples of small movements include high frequency vibrations from a UAV (such as the UAV 210 of FIG. 2C) to which the image stabilization device is attached; unsteady hand of a user holding the attachment arm 120 of FIG. 1; small up-and-down movements of a user operating the image stabilization device while walking, jogging, or the like; and high frequency vibration due to the terrain upon which a vehicle is traveling while carrying the image stabilization device. The image stabilization device cancels such movements and maintains the default setpoint of the imaging device. That is, the image stabilization device stabilizes the imaging device.

On the other hand, larger movements are followed. In a non-limiting example, an operator (i.e., a user operating the image stabilization device) may be following one person. As the person moves, the operator may accordingly move (e.g., turn, etc.) the image stabilization device such that the imaging device maintains the default setpoint with respect to the person. However, if the operator makes, for example, an abrupt and large (e.g., ±90°, ±180°, etc.) swipe with the handle of the image stabilization device, the process 500 can infer that the operator intends to follow another person or object.

Additionally, using an image stabilization device, the imaging device can capture smooth, cinematographic video sequences. In the normal operation mode, the pitch and roll of the image stabilization device may be held constant at the values defined by the user (i.e., the default setpoint). In the yaw axis, there may be a degree of freedom. Keeping the yaw reference constant relative to a platform (e.g., the handheld grip 206 of FIG. 2B or the UAV 210 of FIG. 2C) can be suboptimal. For example, the maximum motor range (i.e., the motor hard stop) may be reached if the smoothness level is high in case of dynamic motion. Accordingly, the stabilization performance may suffer. That is, for example, if the imaging stabilization device continues to maintain the default setpoint as the operator continues to turn the handheld grip toward ±180°, then the hard stop will eventually be reached and the image stabilization device can no longer maintain the yaw angle of the imaging device. However, reducing the smoothness (i.e., the stabilization) in order to prevent reaching the hard stop of a motor can result in robotic video sequences.

To solve the above problems and to enable smoothness along the yaw direction without hitting the motor range limit, even in dynamic conditions, the control unit can predict user intention regarding the yaw setpoint based on the motion of the platform (e.g., a handheld grip). That is, the control unit can determine whether the yaw angle of the imaging device should remain constant (e.g., maintained at the default setpoint) or whether the yaw angle should be changed such that the imaging device follows smoothly the direction of motion of the handle. The yaw setpoint of the image stabilization device can be set based on the prediction. As such, the maximum margin on the motor range can be achieved given the predicted user intention.

In an example of identifying the activity based on the exceptional movement at operation 510, the exceptional movement is identified based on a g-force measured by the sensors of the image stabilization device. As such, the process 500 can determine that the activity is a flip activity as described with respect to FIG. 4. Accordingly, the process 500 can infer, for example, that an operator of the image stabilization device intends to capture a flip rather than rotate the imaging device itself. As such, the activity profile includes operating the motors of the image stabilization device to fix, instead of to stabilize (i.e., smooth), the imaging device in the pitch direction.

In an example of identifying the activity based on the exceptional movement at operation 510, the exceptional movement is identified based on a rotational rate of the image stabilization device. The process 500 can determine that the activity is a lean-into-curve activity. As such, the activity profile includes operating the motors to follow the imaging device in the roll direction. As such, and assuming that the default setpoint is to level the imaging device with the horizon, operating the motors to follow the imaging device in the roll direction means that the image stabilization device may no longer level the imaging device with the horizon.

Stabilized (i.e., along a default setpoint) video sequences of action sports (e.g., motorcycling, mountain biking, etc.) can be perceived as "too perfect" when the stabilized video removes action expected to be included in a video of the particular sport. For example, gimbal-stabilized first person-view footage of down-hill mountain-biking can look boring and does not show the athlete's skills appropriately compared to footage that is not stabilized.

Figure 6D:
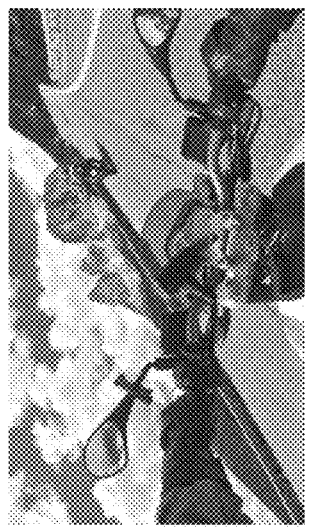
Figure 6E:
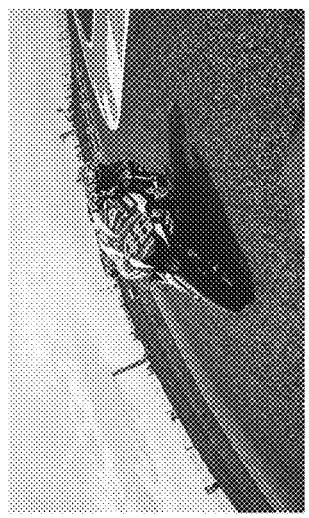

FIGS. 6D-6E depict a motorcyclist leaning into a curve. FIG. 6D can be the first-point-view of the scene of FIG. 6E. As shown in FIGS. 6D-6E, an important aspect of the experience of riding a motorcycle can be the ability to lean into curves. As such, it can be desirable for the imaging device to capture, from the first person-view, the lean into the curve rather than stabilizing the imaging device in the roll direction. As another example, an important aspect of the experience of riding a mountain bike is the ability to negotiate rough terrain including steep descents and high incline climbs. As such, it can be desirable for the imaging device to capture, from the first-person view, the roughness of the terrain.

As such, the image stabilization device can detect the activity (e.g., the activity of the user) and uses a stability profile appropriate for the detected action to match viewers' expectations about the video of the activity. For example, if the activity detected is a motor biking activity, the process 500 can operate the motors of the image stabilization device at operation 510 so that the imaging device leans into the curves while still removing the high frequency vibrations due to the motor bike's engine and/or the road. For example, if the activity detected is a mountain biking activity, the process 500 can cause the image stabilization device to preserve some (but not all) of the shakiness so that the roughness of the track can be transmitted to the viewer in the video sequence captured by the imaging device. For example, the image stabilization device can remove (i.e., cancel) high frequency vibrations or shakiness and preserve (i.e., not cancel) low frequency vibrations. In an example, high frequency vibrations can be vibrations that are greater than a first threshold value such as 5 Hz, 10 Hz, or any other value. In another example, the high frequency vibrations can be a first threshold range, such as 5 Hz to 10 Hz, or any other range. In an example, the low frequency vibrations can be vibrations that are less than a second threshold value. In an example, the second threshold value is 1 Hz. Other values for the second threshold value are possible.

In an example, the process 500 can receive an input from the user regarding the level of shakiness (i.e., vibrations) to be preserved (i.e., not cancelled or stabilized by the image stabilization device). For example, the user can be presented with a typical vibration profile for a user-chosen activity (e.g., motor biking, mountain biking, etc.) and the user can choose, select, set, or the like, a preservation threshold. For example, the user can select a preservation threshold that is a band of vibration frequencies to be preserved. For example, the user preservation threshold can be a maximum vibration frequency to be preserved such that vibrations larger than the preservation threshold are canceled.

In an example, the user can indicate whether the image stabilization device is to preserve leaning into curves. That is, the process 500 can be provided with an input that indicates whether to preserve movements in the roll direction. In an example, the user can indicate that the image stabilization device is to preserve roll movements that are greater than a minimum roll angle (e.g., 10°, 20°, or any other value). As such, identifying the activity can be further based on a user input indicating that the activity is to be identified.

In an example, identifying the activity can be further based on an image stream received from the imaging device by the image stabilization device. The image stream can be as described with respect to FIG. 4.

For simplicity of explanation, the processes 400 and 500 are depicted and described as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Where certain elements of these implementations may be partially or fully implemented using known components, only those portions of such known components that are necessary for an understanding of the present disclosure have been described, and detailed descriptions of other portions of such known components have been omitted so as not to obscure the disclosure.

In the present specification, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "bus" is meant generally to denote all types of interconnection or communication architecture that may be used to communicate data between two or more entities. The "bus" could be optical, wireless, infrared or another type of communication medium. The exact topology of the bus could be for example standard "bus", hierarchical bus, network-on-chip, address-event-representation (AER) connection, or other type of communication topology used for accessing, e.g., different memories in a system.

As used herein, the terms "computer," "computing device," and "computerized device" include, but are not limited to, personal computers (PCs) and minicomputers, whether desktop, laptop, or otherwise, mainframe computers, workstations, servers, personal digital assistants (PDAs), handheld computers, embedded computers, programmable logic device, personal communicators, tablet computers, portable navigation aids, J2ME equipped devices, cellular telephones, smart phones, personal integrated communication or entertainment devices, or literally any other device capable of executing a set of instructions.

As used herein, the term "algorithm," "computer program," or "software" is meant to include any sequence or human or machine cognizable steps which perform a function. Such program may be rendered in virtually any programming language or environment including, for example, C/C++, C#, Fortran, COBOL, MATLAB™, PASCAL, Python, assembly language, markup languages (e.g., HTML, SGML, XML, VoXML), and the like, as well as object-oriented environments such as the Common Object Request Broker Architecture (CORBA), Java™ (including J2ME, Java Beans), Binary Runtime Environment (e.g., BREW), and the like.

As used herein, the terms "connection," "link," "transmission channel," "delay line," and "wireless" mean a causal link between any two or more entities (whether physical or logical/virtual) which enables information exchange between the entities.

As used herein, the terms "integrated circuit," "chip," and "IC" are meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), systems on a chip (SOCs), application-specific integrated circuits (ASICs), and/or other types of integrated circuits.

As used herein, the term "memory" includes any type of integrated circuit or other storage device adapted for storing digital data including, without limitation, ROM, PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the terms "processor," "microprocessor" and "digital processor" are meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "network interface" refers to any signal, data, and/or software interface with a component, network, and/or process. By way of non-limiting example, a network interface may include one or more of FireWire (e.g., FW400, FW110, and/or other variation), USB (e.g., USB2), Ethernet (e.g., 10/100, 10/100/1000 (Gigabit Ethernet), 10-Gig-E, and/or other Ethernet implementations), MoCA, Coaxsys (e.g., TVnet™), radio frequency tuner (e.g., in-band or OOB, cable modem, and/or other protocol), Wi-Fi (802. 11), WiMAX (802. 16), PAN (e.g., 802. 15), cellular (e.g., 3G, LTE/LTE-A/TD-LTE, GSM, and/or other cellular technology), IrDA families, and/or other network interfaces.

As used herein, the term "Wi-Fi" includes one or more of IEEE-Std. 802.11, variants of IEEE-Std. 802.11, standards related to IEEE-Std. 802.11 (e.g., 802.11 a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), HSDPA/HSUPA, TDMA, CDMA (e.g., IS-95A, WCDMA, and/or other wireless technology), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, infrared (i.e., IrDA), and/or other wireless interfaces.

As used herein, the term "robot" or "drone" may be used to describe an autonomous device, autonomous vehicle, computer, artificial intelligence (AI) agent, surveillance system or device, control system or device, and/or other computerized device capable of autonomous operation.

As used herein, the term "camera" may be used to refer to any imaging device or sensor configured to capture, record, and/or convey still and/or video imagery which may be sensitive to visible parts of the electromagnetic spectrum, invisible parts of the electromagnetic spectrum (e.g., infrared, ultraviolet), and/or other energy (e.g., pressure waves).

While certain aspects of the technology are described in terms of a specific sequence of steps of a method, these descriptions are only illustrative of the broader methods of the disclosure and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure.

While the above detailed description has shown, described, and pointed out novel features of the disclosure as applied to various implementations, it will be understood that various omissions, substitutions, and changes in the form and details of the devices or processes illustrated may be made by those skilled in the art without departing from the disclosure. The foregoing description is in no way meant to be limiting, but rather should be taken as illustrative of the general principles of the technologies.

What is claimed is:
1. An image stabilization device for stabilizing an imaging device, comprising:
 sensors for providing sensor data comprising orientation data, angular velocity data, and acceleration data;
 one or more arms;

one or more motors, each motor associated with a respective arm; and a control unit, the control unit configured to:
set a setpoint of the imaging device to a default setpoint, the setpoint corresponding to an orientation of the imaging device;
receive sensor data from the sensors;
determine whether a flip condition exists;
in response to determining that the flip condition exists, stop operating at least one of the motors of the image stabilization device so that the default setpoint is not maintained and the imaging device is not stabilized; and
in response to determining that the flip condition does not exist, maintain the default setpoint to stabilize the imaging device by moving at least one of the one or more arms with one of the respective motors.

2. The image stabilization device of claim 1, wherein to determine whether the flip condition exists comprises to:
detect a g-force exceeding a threshold; and
determine that the flip condition exists based on the g-force exceeding the threshold.

3. The image stabilization device of claim 2,
wherein to determine whether the flip condition exists further comprises to:
receive, by the image stabilization device, an image stream from the imaging device; and
detect an activity indicative of the flip condition based on the image stream; and
wherein to determine that the flip condition exists is further based on detecting the activity.

4. The image stabilization device of claim 3, wherein to detect, based on the image stream, the activity, comprises to:
detect an object indicative of the flip condition in the image stream.

5. The image stabilization device of claim 2, wherein to determine whether the flip condition exists is further based on a user input indicating that the imaging device is to be flipped.

6. An image stabilization device for stabilizing an imaging device, comprising:
sensors for providing sensor data comprising orientation data, angular velocity data, and acceleration data;
one or more arms;
one or more motors, each motor associated with a respective arm; and
a control unit, the control unit configured to:
set a setpoint of the imaging device to a default setpoint;
receive sensor data from the sensors;
in response to the sensor data, maintain the default setpoint of the imaging device by moving at least one of the one or more arms with at least one of the respective motors;
identify an exceptional movement of the image stabilization device,
wherein the exceptional movement is identified based on one or more movements of the image stabilization device over time, and
wherein the exceptional movement indicates to the control unit that the image stabilization device is to stop maintaining the default setpoint;
identify, based on the exceptional movement in at least one of a yaw direction, a pitch direction, and a roll direction of the image stabilization device, an activity, wherein the image stabilization device is worn by or carried by a person performing the activity; and
operate the one or more motors of the image stabilization device according to an activity profile associated with the activity.

7. The image stabilization device of claim 6, wherein to identify the activity is further based on a user input indicating that the activity is to be identified.

8. The image stabilization device of claim 6,
wherein the exceptional movement comprises an acceleration in the yaw direction,
wherein the activity is a panning activity, and
wherein the activity profile includes operating the motors of the image stabilization device to follow, instead of to stabilize, the imaging device in the yaw direction.

9. The image stabilization device of claim 6,
wherein the exceptional movement is identified based on a g-force measured by the sensors of the image stabilization device, and
wherein the activity profile includes to operate the one or more motors of the image stabilization device to fix, instead of to stabilize, the imaging device in the pitch direction.

10. The image stabilization device of claim 9, wherein to operate the one or more motors of the image stabilization device to fix, instead of to stabilize, the imaging device in the pitch direction comprises to:
disable flipping of the imaging device.

11. The image stabilization device of claim 10, wherein the activity includes a flip activity.

12. The image stabilization device of claim 6,
wherein the exceptional movement is identified based on a rotational rate of the image stabilization device, and
wherein the activity profile includes operating the motors to follow the imaging device in the roll direction.

13. The image stabilization device of claim 12, wherein the activity includes a leaning activity.

14. The image stabilization device of claim 6, wherein the identifying the activity is further based on an image stream received from the imaging device by the image stabilization device.

15. A method for stabilizing an imaging device with an image stabilization device, comprising:
operating, based on sensor data, motors of the image stabilization device to stabilize the imaging device to a default setpoint;
identifying an exceptional movement of the image stabilization device, wherein the exceptional movement indicates that the image stabilization device is to stop maintaining the default setpoint;
identifying, based on the exceptional movement of the image stabilization device in at least one of a yaw direction, a pitch direction, and a roll direction, an activity, wherein the image stabilization device is worn by or carried by a person performing the activity; and
operating the motors of the image stabilization device according to an activity profile associated with the activity.

16. The method of claim 15,
wherein the exceptional movement comprises an acceleration in the yaw direction,
wherein the activity is a panning activity, and
wherein operating the motors of the image stabilization device according to the activity profile associated with the activity, comprises:
operating the motors of the image stabilization device to follow, instead of to stabilize, the imaging device in the yaw direction.

17. The method of claim 15,
wherein the exceptional movement is identified based on a g-force of the image stabilization device, and
wherein operating the motors of the image stabilization device according to the activity profile associated with the activity, comprises:
operating the motors of the image stabilization device to fix, instead of to stabilize, the imaging device in the pitch direction.

18. The method of claim 17, wherein operating the motors of the image stabilization device to fix, instead of to stabilize, the imaging device in the pitch direction comprises:
disabling flipping of the imaging device.

19. The method of claim 15,
wherein the exceptional movement is identified based on a rotational rate of the image stabilization device, and
wherein operating the motors of the image stabilization device according to the activity profile associated with the activity, comprises:
operating the motors of the image stabilization device to follow, instead of to stabilize, the imaging device in the roll direction.

20. The method of claim 15, wherein the identifying the activity is further based on an image stream received from the imaging device by the image stabilization device.

* * * * *